Patented Aug. 14, 1945

2,382,288

UNITED STATES PATENT OFFICE 2,382,288

METHOD FOR SEPARATION OF HYDROXY CARBOXYLIC ACIDS

Geza Braun and Orville N. Breivik, New York, N. Y., assignors to Standard Brands, Incorporated, New York, N. Y., a corporation of Delaware No Drawing. Application February 9, 1944, Serial No. 521,732

6 Claims. (Cl. 260—536)

The invention relates to a method for separating hydroxy carboxylic acids. More particularly, it pertains to a separation of tartaric acids and saccharic acid, and includes correlated improvements and discoveries whereby obtainment of these acids may be enhanced.

An object of the invention is the provision of a procedure in accordance with which mixed hydroxy carboxylic acids and/or salts thereof may be quantitatively separated one from the other.

Another object of the invention is to provide a method for the separation of a mixture of tartaric acids and saccharic acid, either as such or in the form of their salts, into the various constituents.

A further object of the invention is the provision of a method for separating tartaric acids and saccharic acid, that may be readily, effectively and economically practiced.

A specific object of the invention is the provision of a procedure for the separation of dl-, d-, and meso-tartaric acids and saccharic acid from a composition containing them in admixture.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

In the practice of the invention a composition containing tartaric acids, i. e., dl-, d-, and meso-, and similar hydroxy carboxylic acids resulting from the oxidation of a carbohydrate material, as saccharic acid, may be separated into its various constituents—the respective acids—by first effecting crystallization of dl-tartaric acid by lowering the temperature, then separating d-tartaric acid through fractional crystallization under certain definite conditions, removing the meso-tartaric acid through precipitation as the calcium salt through treatment with lime, and finally obtaining the remaining hydroxy carboxylic acids as saccharic acid by treating mother liquor obtained from the separation of calcium meso-tartrate by heating, and then adding a mixture of calcium chloride and lime. This effects precipitation of the hydroxy carboxylic acids as the basic salts, and such salts may be converted into the corresponding acids by means of sulfuric acid. Calcium sulfate is thereby formed, precipitates, and may be removed by filtration. The filtrate, if desired, may be concentrated to a syrupy consistency containing about 80% solids.

Somewhat more particularly, and with a mixture of calcium salts of tartaric acids and of saccharic acid as a separatable material, such salt mixture may be treated with an amount of sulfuric acid which is sufficient to convert the calcium salts into the acids with formation and separation of calcium sulfate as a precipitate. The calcium sulfate is removed, as by means of a centrifuge, and the cake obtained washed, with obtention of a liquor of about 27° Bé. It is desirable that separation of the calcium sulfate from acid liquor be carried out in a centrifuge which is not attacked by the liquors, as one lined with rubber and which has been preheated. It has been found that the separation can be accomplished with much greater readiness when the centrifuge has been suitably preheated. Separation of the tartaric acids and of saccharic acid from the acid liquor may then be brought about by first effecting crystallization of dl-tartaric acid by concentrating the liquor and cooling, preferably to a temperature of about 5° C. The dl-tartaric acid obtained may be separated from the liquid by filtering, as in a filter press, and the acid obtained was found to be about 99% pure. From the filtrate which contains d- and meso-tartaric acids, perhaps a small amount of dl-tartaric acid and saccharic acid, the d-acid is attained by fractional crystallization by concentrating initially to about 43° Bé. and later to about 47° Bé. The acid solution may be concontrated at a temperature of about 75° C., and, following concentration, may be cooled slowly to about 32° C. The d-tartaric acid crystallizes from the solution and may be withdrawn centrifugally. Such separation is followed by further concentration at about 75° C. to about 47° Bé. Granulation of d-tartaric acid may then be effected by lowering the temperature to about 45° C. whereupon the acid produced may be substantially freed from the liquid by means of a centrifuge which has been preheated to about 45° C.

The outlined procedure accomplishes a marked separation of the d-tartaric acid, and this may be more fully brought about by treating the liquids in a manner to form potassium hydrogen tartrate which may be removed and used as such, or converted into tartaric acid. The d-tartaric acid so obtained, as well as the potassium hydrogen tartrate, are of high purity. When the d-tartaric acid has been separated the mother liquor which now contains meso-tartaric, saccharic and other hydroxy acids is treated to remove the meso-tartaric acid as its calcium salt. The treatment is with lime which converts all of the acids into their calcium salts with precipitation of calcium meso-tartrate inasmuch as it is relatively insoluble in a slightly acid solution, i. e., having a pH value of about 6.8, whereas the calcium saccharate and related compounds do not precipitate immediately from such solution. The calcium meso-tartrate may be converted into the acid by reaction with sulfuric acid, and the meso-tartaric acid so obtained may be purified by treating the acid-containing solution with barium or calcium ferro-cyanide and with carbon to remove iron and coloring matter, with the meso-tartaric acid being permitted to crystallize from the solution. The liquid arising from the meso-tartaric acid separation and which contains calcium salts of saccharic and other hydroxy acids may now have added thereto lime and some calcium chloride at a temperature of about 100° F., which leads to the formation of the basic salts of those acids. These basic salts may be reacted with sulfuric acid to produce the acid and calcium sulfate, with concentration of the acid liquor following filtering to take out the calcium sulfate, to a syrup which may contain about 80% solids. The procedure hereinbefore outlined occasions a substantially complete separation of the various constituents from a mixture containing dl-, d- and meso-tartaric acids and saccharic acid, which original mixture may have been either in the form of the acids themselves or as the calcium salts thereof.

Somewhat more particularly, and by way of an illustrative embodiment of a manner in which the invention may be practiced, the following detailed description is presented.

A composition containing dl-, d- and meso-tartaric acids and saccharic acid in the form of their calcium salts is first reacted with sulfuric acid by suspending, for example, about 80 lbs. in about 25 gals. of water, or a tartaric acid solution arising from a previous procedure, heated to about 60° C. and about 34 lbs. of sulfuric acid introduced with constant stirring. Calcium sulfate is thus formed through the conversion of the calcium salts into the acids, and this calcium sulfate may be removed as, for example, with a centrifuge, desirably heated and made from a material which is resistant to the acid liquor, or lined with such a material. Thus, utilization may be made of a centrifuge which is rubber lined. The calcium sulfate cake is washed free from acid, first with weak liquors and then with hot water. The liquor obtained is of about 27° Bé. strength, and has a specific gravity of about 1.228 at 15° C.

Moreover, the liquor may have a strength of about 24° Bé., and such concentration may be particularly well adapted for large scale operations. The 27° Bé. liquor is concentrated to about 34° Bé. and cooled to a temperature of about 5° C., with constant stirring. A precipitation of dl-tartaric acid is thus brought about after about two hours of stirring, and this, together with some calcium sulfate which previously escaped removal, may be separated from the liquid by means of a filter press, the cake being washed with a small amount of ice water. A pure acid may be obtained by recrystallizing the cake or impure acid by dissolving in hot water and then recrystallizing. The mother liquor obtained thus may also be concentrated and crystallization brought about until there is no further formation of dl-tartaric acid. The final liquor from the purification may be united with the original filtrate or acid liquor.

Following removal of the dl-tartaric acid the liquor which may contain about 66% d-tartaric acid and about 33% meso-tartaric and saccharic or other hydroxy acids, is concentrated initially to about 43° Bé. at a temperature of about 75° C., and the liquor or mixture slowly cooled to about 32° C. during a period of three to four hours with constant stirring. A fractional crystallization of d-tartaric acid ensues and may be removed from the liquor by a centrifuge, with complete draining and washing first with dry steam, then with small amounts of a saturated d-tartaric acid solution, and again with dry steam. It is desirable that the centrifuge be preheated, as with steam, to about 50° C. The mother liquor coming from the first crystallization of tartaric acid may be concentrated to about 47° Bé. at a temperature of 75° C., and crystals formed through granulation at a temperature of about 45° C. The mass is centrifuged with a preheating to a temperature of about 45° C. The crystals so obtained are washed in the manner above mentioned and the d-tartaric acid separated is of excellent purity. Should an acid of higher purity be required, then that which has been obtained as above may be dissolved to form a 43° Bé. solution, seeded with calcium sulfate crystals, allowed to stand as long as crystallization of calcium sulfate takes place, whereupon it may be clarified in a centrifuge and the acid obtained through vacuum granulation. The mother liquor may be further concentrated and treated in a similar fashion, with the final liquors having iron and other impurities removed through addition of barium or calcium ferrocyanide.

The d-tartaric acid remaining in the liquid may, if desired, be recovered either by using the liquors as the medium within which to suspend the initial mixture of salts, or by treatment thereof to produce potassium acid tartrate, as by neutralization of one-half of the acid present with potassium hydroxide or carbonate, or by means of sodium carbonate in the presence of potassium salts. To bring this about the mother liquor may be heated to about 160° F., and the iron precipitated with sodium ferro-cyanide. An active carbon may now be added to bring about clarification and, following introduction of a filter aid the mixture may be filtered, as with a small filter press, and the residue or cake washed free from acid with hot water. To the liquor thus obtained, which has a density of 27° Bé., and may be of a volume of about 29 gals., there may be added about 50 lbs. of potassium chloride in 11 gals. of a hot aqueous solution. The reaction mixture having a temperature of about 110° F. may be neutralized to a pH value of about 2.5 through the gradual addition of 34 lbs. of sodium carbonate. The temperature may then be raised to about 130° F. during an hour, and with constant stirring, whereupon the reaction mass may be immediately centrifuged. The residue is washed chloride-free with water and the potassium hydrogen tartrate has a purity of 99-99.2%. This may be further purified by recrystallization with water, if desired, and the mother liquor may be re-used for dissolving a succeeding lot of potassium hydrogen tartrate which is to be purified.

The solution obtained from the separation of d-tartaric acid contains the meso-tartaric acid and the saccharic and other hydroxy acids, and the meso-tartaric acid may be obtained by diluting the liquor to a volume of about 70 gals. with hot water. The solution is heated to about 150° F. in a suitable manner as, for example, by means of live steam. A neutralization is then brought about through the addition of calcium hydroxide to a pH value from about 6.5 to 6.8, and this may be followed with the incorporation of about 44 lbs. calcium sulfate suspended in 10 gals. of hot water, whereby calcium meso-tartrate precipitates. A slight excess of calcium sulfate may be employed, and the completion of the reaction may be determined by filtering a small sample from time to time and determining the amount of sulfate therein by titration with a 5% barium chloride solution. Addition of calcium sulfate is continued as long as the amount of soluble sulfate in the filtrate increases.

After stirring for about two hours the precipitated calcium meso-tartrate is separated from the mother liquor, as by centrifuging, and the residue or cake washed with water until no turbidity results following the addition of lime water. The calcium meso-tartrate so produced may be converted into meso-tartaric acid by suspending in hot water or weak acid liquor, and conversion accomplished through the addition of 95% sulfuric acid at about 140° F. The calcium sulfate which precipitates may be removed by centrifuging, and the cake washed acid-free with hot water. A concentration of the liquor containing meso-tartaric acid to about 42 to 48° Bé. is accomplished, and the meso-tartaric acid secured through granulation under vacuum. The acid separated may be obtained by centrifuging and washing with a small amount of saturated liquor. The final mother liquor, which carries some sulfuric acid, may have it removed through the addition of lime, the solution then being filtered from calcium sulfate and the filtrate neutralized with lime to a pH value of 6.8 at 150° F. A further amount of calcium meso-tartrate is thus secured, and a substantially complete separation thereof is thereby effected. This calcium meso-tartrate may be combined with a subsequent lot for conversion into the acid. Furthermore, the meso-tartaric acid produced may be purified in the same manner as above set forth with respect to d-tartaric acid. The acid has a purity of about 99.8% as determined by titration, and if an anhydrous acid is sought it may be secured by drying at about 200° F. to constant weight.

The solution, following precipitation of the meso-tartaric acid, contains saccharic and other hydroxy acids as calcium salts. These may be isolated as the basic salts by heating the solution to about 150° F., and then adding a mixture of calcium chloride and lime until a clear sample of filtrate does not give further precipitate with lime water. The reaction mixture may then be centrifuged while hot and the cake washed with lime water until it is free from chloride. The calcium salt resulting, while in wet condition, may be suspended in hot water and converted into acid by means of sulfuric acid. The calcium sulfate produced is removed from the solution by filtering, e. g. with a centrifuge, and the residue washed free from acid. A liquor containing saccharic acid and other hydroxy acids is accordingly produced, and may be concentrated to a syrup which contains about 80% solids. The syrup contains some tartaric acids, saccharic acid and other hydroxy acids, and although attended with some difficulty, it may, if necessary, be fractionated through the acid potassium salts.

The foregoing procedures effect a substantially quantitative resolution of a mixture containing dl-, d- and meso-tartaric acids, saccharic acid and other hydroxy acids, either as such or as salts in the initial composition, into the various constituents. The several stages in the procedure and effective separations are attained by a close adherence to the conditions set forth. When these conditions are not closely followed, a less effective separation of the constituents of the mixture will be accomplished which will occasion the obtention of products of decidedly lower purity and not well adapted for practical use. This more particularly attends the separation of d-tartaric acid through fractional crystallization wherein the mother liquor, following removal of dl-tartaric acid, is first concentrated to about 43° Bé. at 75° C., and the mixture cooled slowly to about 32° C. in from three to four hours with constant stirring. The acid formed is then removed by centrifugation and the liquor concentrated to about 47° Bé. at 75° C., followed by crystallization of the acid through granulation at 45° C. It may be added that a more thorough removal of d-tartaric acid as potassium bitartrate may be brought about, but if it should be so desired the final mother liquor may be directly subjected to the steps whereby calcium meso-tartrate is formed.

Furthermore, and by way of illustration, the procedures described herein have led to the following results when a mixture of calcium tartrates and saccharate containing about 240 lbs. of the acids was separated:

|  | Amount obtained | Corres. to anhydrous acid | Purity | Percent of mixture | Percent of acid mixture applied |
| --- | --- | --- | --- | --- | --- |
|  | Lbs. | Lbs. | Percent | Percent | Percent |
| dl-Tartaric acid | 5.4 | 4.8 | 99 | 1.2 | .2 |
| d-Tartaric acid | 109 | 108 | 99 | 27 | 45 |
| Cream of tartar (d-) | 45.8 | 36.6 | 99 | 9.15 | 15.25 |
| Meso-tartaric acid | 65.8 | 58.75 | 98½ | 14.7 | 24.50 |
| Total tartaric acids | 226.0 | 208.15 |  | 52.05 | 86.75 |
| Saccharic acid, etc | 17.8 | 13.75 |  | 3.44 | 6.00 |
| Total accounted for |  |  |  | 55.49 | 92.75 |

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A method for the separation of tartaric acids, saccharic acid and similar hydroxy carboxylic acids in a mixture resulting from the oxidation of a carbohydrate material, which comprises, effecting crystallization of dl-tartaric acid from solution through concentration thereof followed by cooling to about 5° C., separating crystallized acid and liquid, concentrating liquid to about 43 to 47° Bé., then cooling whereupon d-tartaric acid crystallizes out, removing crystals from liquid, diluting liquid so obtained, heating, neutralizing to a pH value from about 6.5 to 6.8, adding calcium sulfate thereto whereby a precipitate of calcium meso-tartrate results, separating calcium meso-tartrate and liquid, heating liquid so obtained, effecting precipitation of residual tartaric acids and similar hydroxy carboxylic acids contained therein through treatment with calcium hydroxide and a soluble calcium compound, filtering to obtain precipitated calcium salts, decomposing with an acid yielding an insoluble salt with calcium, again filtering, and concentrating the filtrate to recover a product which is principally saccharic acid.

2. A method for the separation of tartaric acids, saccharic acid and similar hydroxy carboxylic acids in a mixture resulting from the oxidation of a carbohydrate material, which comprises effecting crystallization of dl-tartaric acid from solution through concentration thereof followed by cooling to about 5° C., separating crystallized acid and liquid, concentrating liquid to about 43 to 47° Bé., then cooling whereupon d-tartaric acid crystallizes out, removing crystals from liquid, diluting liquid so obtained, heating, neutralizing to a pH value from about 6.5 to 6.8, adding calcium sulfate thereto whereby a precipitate of calcium meso-tartrate results, separating calcium meso-tartrate and liquid, heating liquid so obtained, effecting precipitation of saccharic acid contained therein through treatment with calcium hydroxide and a soluble calcium compound, filtering to obtain precipitated calcium saccharate, decomposing with an acid yielding an insoluble salt with calcium, again filtering, and concentrating the filtrate to recover a product which is principally saccharic acid.

3. A method for the separation of tartaric acids, saccharic acid and similar hydroxy carboxylic acids in a mixture resulting from the oxidation of a carbohydrate material, which comprises effecting crystallization of dl-tartaric acid from solution through concentration thereof followed by cooling to about 5° C., separating crystallized acid and liquid, concentrating liquid to about 43 to 47° Bé., then cooling whereupon d-tartaric acid crystallizes out, removing crystals from liquid, diluting liquid so obtained, heating, neutralizing to a pH value from about 6.5 to 6.8, adding calcium sulfate thereto whereby a precipitate of calcium meso-tartrate results, separating calcium meso-tartrate and liquid, heating liquid so obtained, effecting precipitation of saccharic acid contained therein through treatment with calcium hydroxide and calcium chloride, filtering to obtain precipitated calcium saccharate, decomposing with an acid yielding an insoluble salt with calcium, again filtering, and concentrating the filtrate to recover a product which is principally saccharic acid.

4. A method for the separation of tartaric acids, saccharic acid and similar hydroxy carboxylic acids in a mixture resulting from the oxidation of a carbohydrate material, which comprises, effecting crystallization of dl-tartaric acid from solution through concentration thereof to about 34° Bé. followed by cooling to about 5° C., separating crystallized acid and liquid, concentrating liquid to about 43 to 47° Bé. at about 75° C., then cooling whereupon d-tartaric acid crystallizes out, removing crystals from liquid, diluting liquid so obtained, heating, neutralizing to a pH value from about 6.5 to 6.8, adding calcium sulfate thereto whereby a precipitate of calcium meso-tartrate results, separating calcium meso-tartrate and liquid, heating liquid so obtained, effecting precipitation of saccharic acid contained therein through treatment with calcium hydroxide and calcium chloride, filtering to obtain precipitated calcium saccharate, decomposing with an acid yielding an insoluble salt with calcium, again filtering, and concentrating the filtrate to recover a product which is principally saccharic acid.

5. A method for the separation of tartaric acids, saccharic acid and similar hydroxy carboxylic acids in a mixture resulting from the oxidation of a carbohydrate material, which comprises, effecting crystallization of dl-tartaric acid from solution through concentration thereof to about 34° Bé. followed by cooling to about 5° C., separating crystallized acid and liquid, concentrating liquid to about 43 to 47° Bé. at about 75° C., then cooling to a temperature of about 32° C. whereupon d-tartaric acid crystallizes out, removing crystals from liquid at a temperature of about 50° C., diluting liquid so obtained, heating to a temperature of about 150° F., neutralizing to a pH value from about 6.5 to 6.8, adding calcium sulphate thereto whereby a precipitate of calcium meso-tartrate results, separating calcium meso-tartrate and liquid, heating liquid so obtained to a temperature of about 150° F., effecting precipitation of saccharic acid contained therein through treatment with calcium hydroxide and calcium chloride, filtering to obtain precipitated calcium saccharate, decomposing with sulfuric acid, again filtering, and concentrating the filtrate to recover a product which is principally saccharic acid.

6. A method for the separation of tartaric acids, saccharic acid and similar hydroxy carboxylic acids in a mixture resulting from the oxidation of a carbohydrate material, which comprises, effecting crystallization of dl-tartaric acid acid from solution through concentration thereof to about 34° Bé. followed by cooling to about 5° C., separating crystallized acid and liquid, concentrating liquid to about 43° Bé. at about 75° C., then cooling to a temperature of about 32° C. whereupon d-tartaric acid crystallizes out, removing crystals from liquid at a temperature of about 50° C., concentrating said liquid to about 47° Bé. at 75° C., granulating at about 45° C. with obtainment of a further quantity of d-tartaric acid, separating crystals and liquid, then diluting liquid so obtained, heating to a temperature of about 150° F., neutralizing to a pH value from about 6.5 to 6.8, adding calcium sulfate thereto whereby a precipitate of calcium meso-tartrate results, separating calcium meso-tartrate and liquid, heating liquid so obtained to a temperature of about 150° F., effecting precipitation of saccharic acid contained therein through treatment with calcium hydroxide and calcium chloride, filtering to obtain precipitated calcium saccharate, decomposing with sulfuric acid, again filtering, and concentrating the filtrate to recover a product which is principally saccharic acid.

GEZA BRAUN.
ORVILLE N. BREIVIK.